(12) United States Patent
Zheng

(10) Patent No.: US 7,793,406 B2
(45) Date of Patent: Sep. 14, 2010

(54) METHOD FOR MANUFACTURING A MAGNETIC WRITE HEAD

(75) Inventor: Yi Zheng, San Ramon, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 386 days.

(21) Appl. No.: 11/951,204

(22) Filed: Dec. 5, 2007

(65) Prior Publication Data

US 2009/0144966 A1    Jun. 11, 2009

(51) Int. Cl.
*G11B 5/127* (2006.01)
*H04R 31/00* (2006.01)

(52) U.S. Cl. ............ 29/603.16; 29/603.07; 29/603.13; 29/603.15; 29/603.18; 205/199; 205/122; 216/62; 216/65; 216/66; 360/121; 360/122; 360/317; 451/5; 451/41

(58) Field of Classification Search ............ 29/603.07, 29/603.13–603.16, 603.18; 205/119, 122; 216/62, 65, 66; 360/121, 122, 317; 451/5, 451/41

See application file for complete search history.

(56) References Cited

U.S. PATENT DOCUMENTS

2007/0258167 A1*  11/2007  Allen et al. ............... 360/126
2009/0117407 A1*  5/2009  Zheng et al. .............. 428/810

* cited by examiner

*Primary Examiner*—Paul D Kim
(74) *Attorney, Agent, or Firm*—Zilka-Kotab, PC

(57) ABSTRACT

A method for manufacturing a perpendicular magnetic write head having a trailing shield and with a tapered step. The method includes forming a write pole with a non-magnetic trailing gap and first and second non-magnetic side gap layers. A mask is formed having an opening over a portion of the write pole that is configured to define a non-magnetic bump. A non-magnetic bump material is deposited into the opening in a manner that defines a non-magnetic bump having a tapered front edge. A magnetic wrap around shield can then be formed over the non-magnetic bump, so that the bump forms a tapered stepped feature on the wrap-around magnetic shield. The bump location can be controlled by an electric lapping guide, which is defined to be aligned to the bump front edge.

19 Claims, 14 Drawing Sheets

METHOD FOR MANUFACTURING A MAGNETIC WRITE HEAD

FIELD OF THE INVENTION

The present invention relates to perpendicular magnetic recording and more particularly to a method for manufacturing a magnetic write head having a tapered, stepped trailing shield structure for improved magnetic performance.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a perpendicular magnetic write head having a trailing shield and with a tapered step. The method includes forming a write pole with a non-magnetic trailing gap and first and second non-magnetic side gap layers. A mask is formed having an opening over a portion of the write pole that is configured to define a non-magnetic bump. A non-magnetic bump material is deposited into the opening in a manner that defines a non-magnetic bump having a tapered front edge. A magnetic wrap around shield can then be formed over the non-magnetic bump, so that the bump forms a wrap-around magnetic shield having a tapered stepped feature.

The method can be used to form an electrical lapping guide in a common patterning step with that used to pattern the non-magnetic bump, thereby allowing for very accurate placement of the non-magnetic bump, and resulting tapered shield step.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
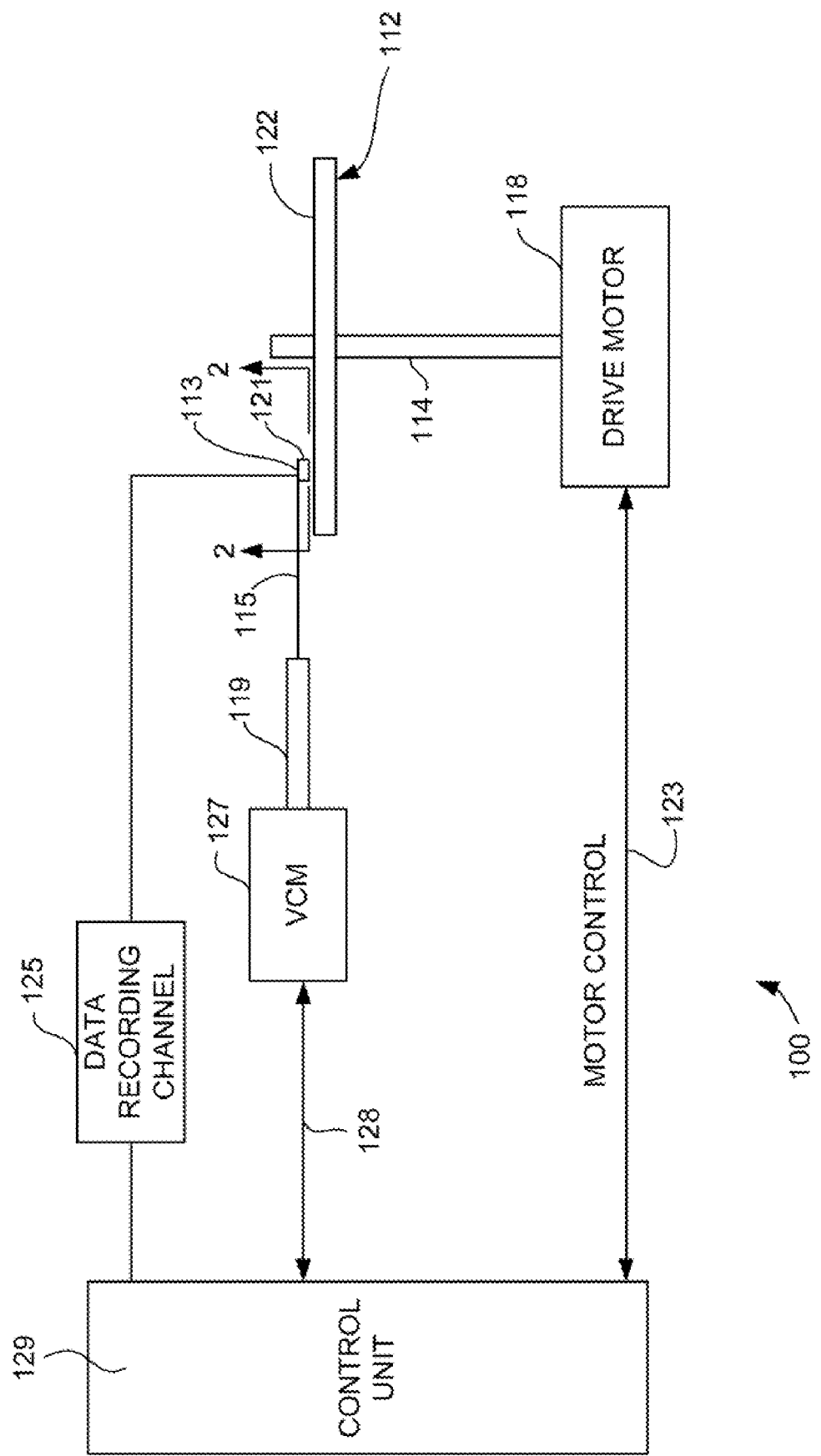
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
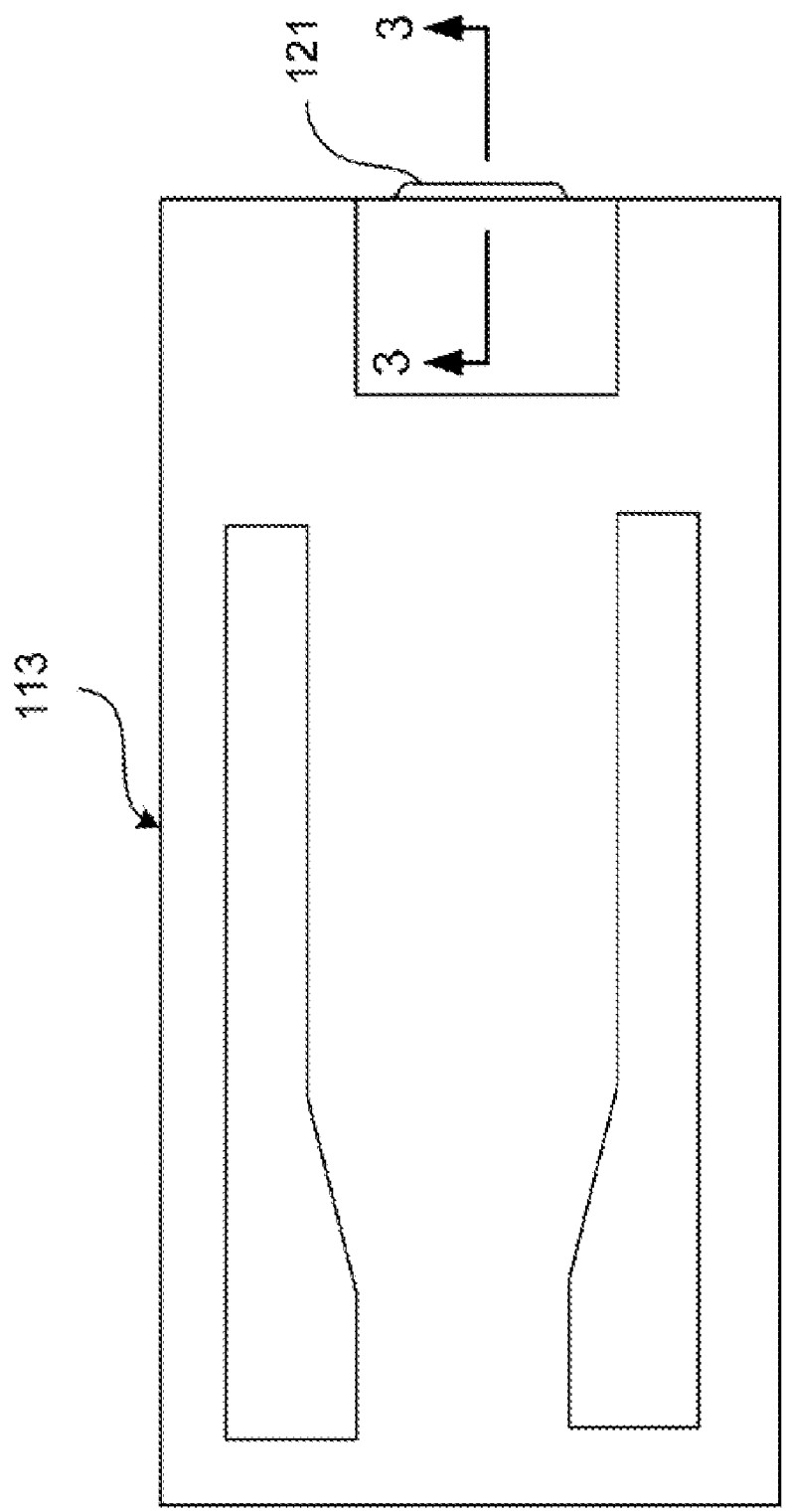
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
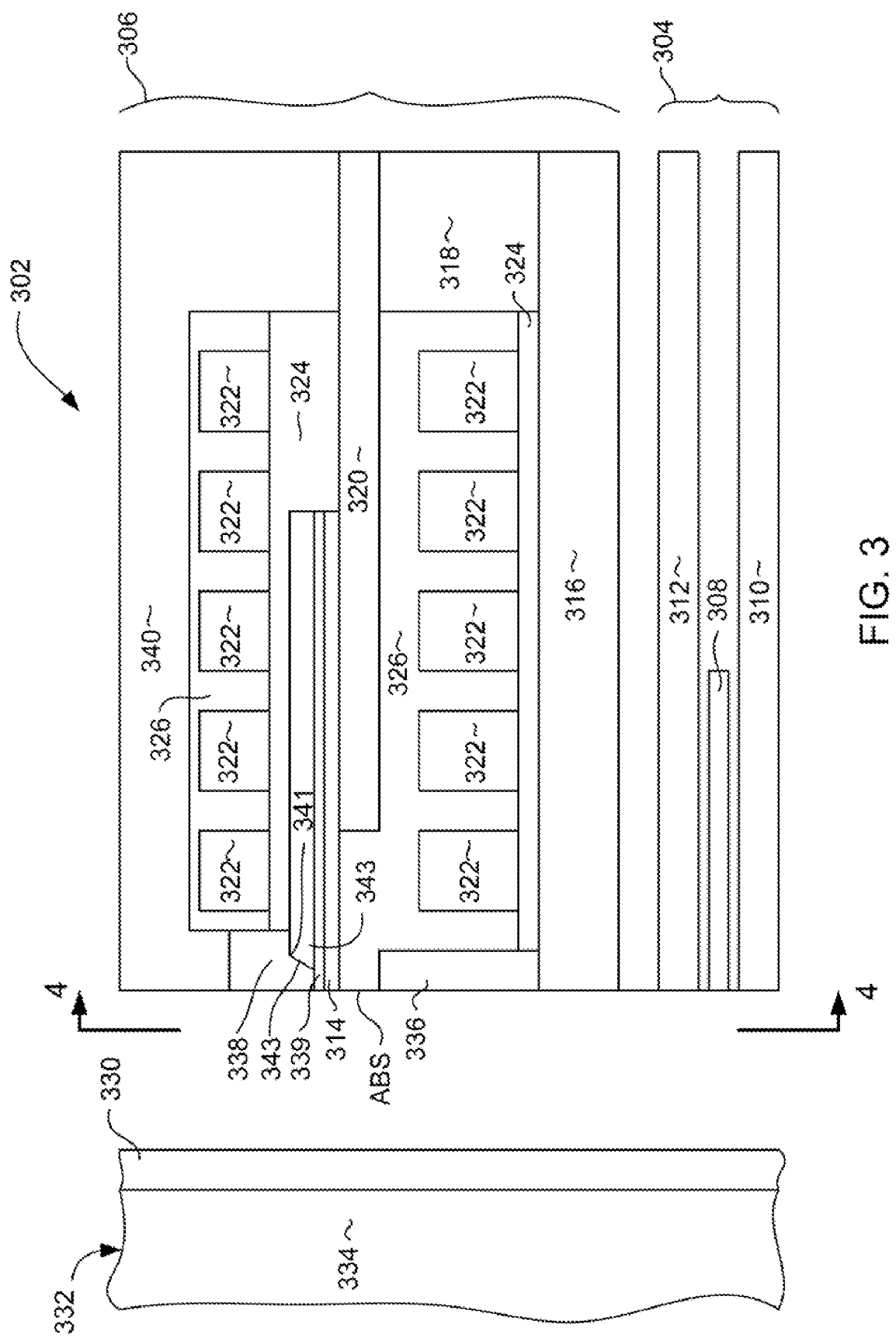
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314.

In order to increase write field gradient, and therefore, increase the speed with which the write head 306 can write data, a trailing, wrap around magnetic shield 338 can be provided. The trailing, wrap around magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient.

With reference still to FIG. 3, the trailing shield 338 has a step 341 formed at its back edge away from the ABS. This step 341 is formed by a non-magnetic bump 343 that is strategically located between a portion of the trailing shield 338 and the trailing gap layer 339 and write pole 314. This step 341 improves the performance enhancing effects of the trailing shield by achieving better write field strength due to less flux shunting to the back of trailing shield 338 while also preventing magnetic saturation of the trailing shield. As can be seen, the step 341 is has a sloping edge 343. This sloping front edge has been found to further improve the performance of the wrap-around, trailing magnetic shield 338, by helping to channel magnetic flux to the portion of the shield adjacent to the write pole 314, while also preventing flux leakage to the shield. This sloped step 341 and a method for manufacturing such a step will be discussed in greater detail below.

Figure 4:
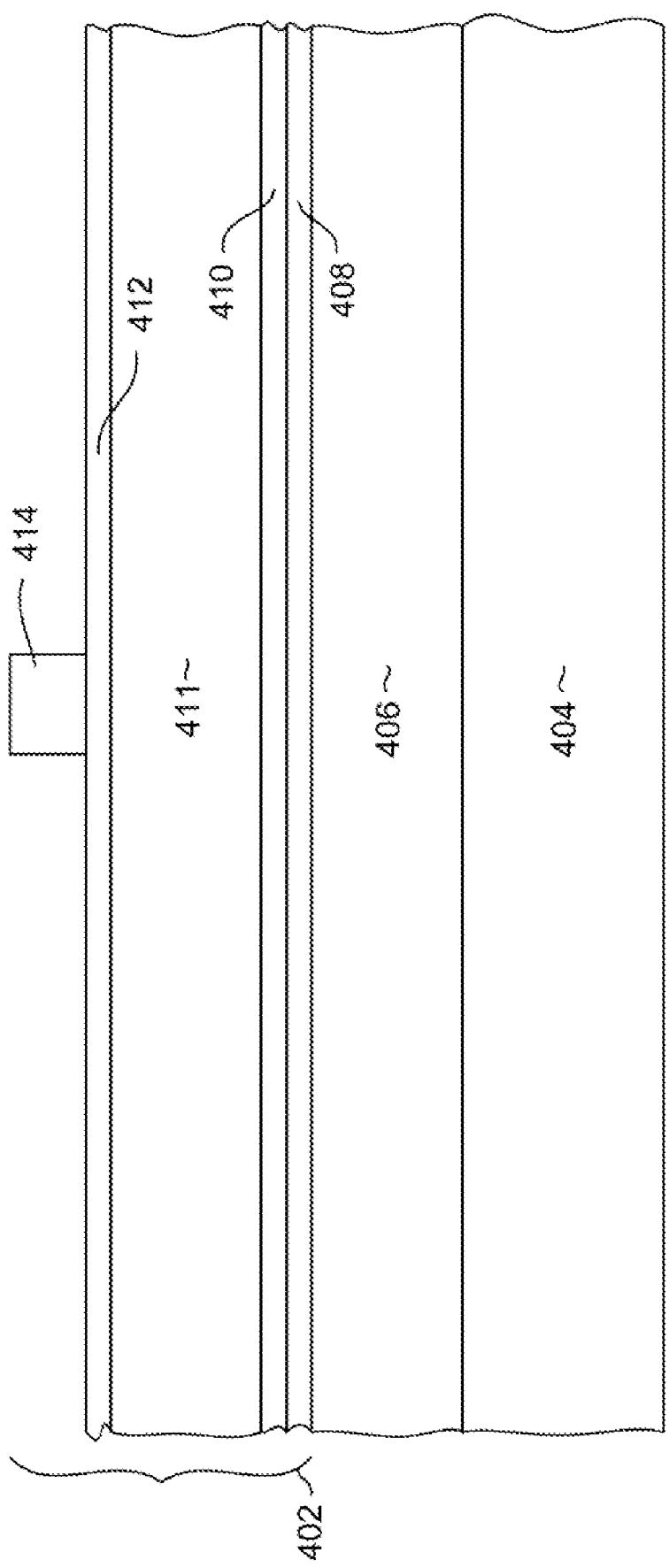
FIG. 4 is an ABS view of a portion of the write head of FIG. 3.

With reference now to FIGS. 4-15 a method is described for manufacturing a write head with a bump 343 and step 341. This method allows the front edge of the bump 343 (and therefore the step 341) to be accurately located relative to the back edge of the shield 338, as will be seen. With particular reference to FIG. 4, a substrate 404 is provided. The substrate 404 may include the insulation layer 326 and a portion of the shaping layer 320 described above with reference to FIG. 3. A magnetic write pole material 406 is deposited over the substrate 404. The magnetic write pole material 406 is preferably a lamination of magnetic layers separated by thin non-magnetic layers. A mask structure 402, constructed of a series of mask layers is deposited over the magnetic write pole material. The mask structure 402 includes a first hard mask layer 408, which is preferably alumina, deposited over the magnetic write pole material. This hard mask layer 408 is preferably deposited to a thickness that will define a trailing gap in the finished head. A second hard mask layer 410 is deposited over the first hard mask layer. The second hard mask layer is constructed of a material that can be removed by Reactive Ion Etching (RIE) such materials being referred to herein as "RIEable" materials. An image transfer layer 411 can be deposited over the RIEable second hard mask layer 410. The image transfer layer can be constructed of a soluble polyimide material such as DURAMIDE®. A third hard mask layer 412, such as SiO$_2$, may also be deposited over the image transfer layer 411. A photoresist layer 414 is then deposited over the other underlying mask layers 408-412, and is photolithographically patterned to define a write pole shape, which is shown in cross section in FIG. 4.

Figure 5:
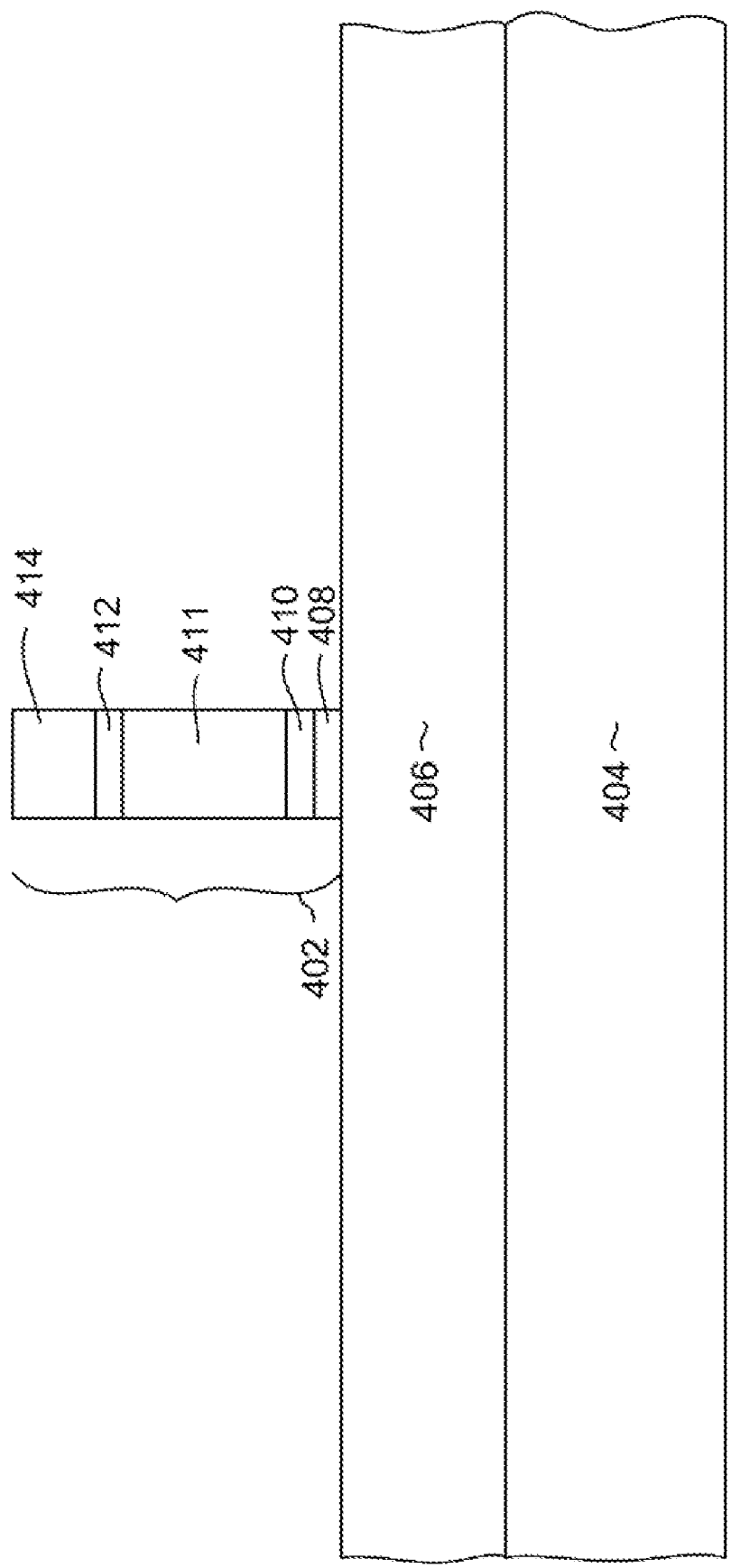
FIGS. 5-14 are views of a write head in various intermediate stages of manufacture illustrating method for manufacturing a write head according to an embodiment of the invention.
Figure 6:
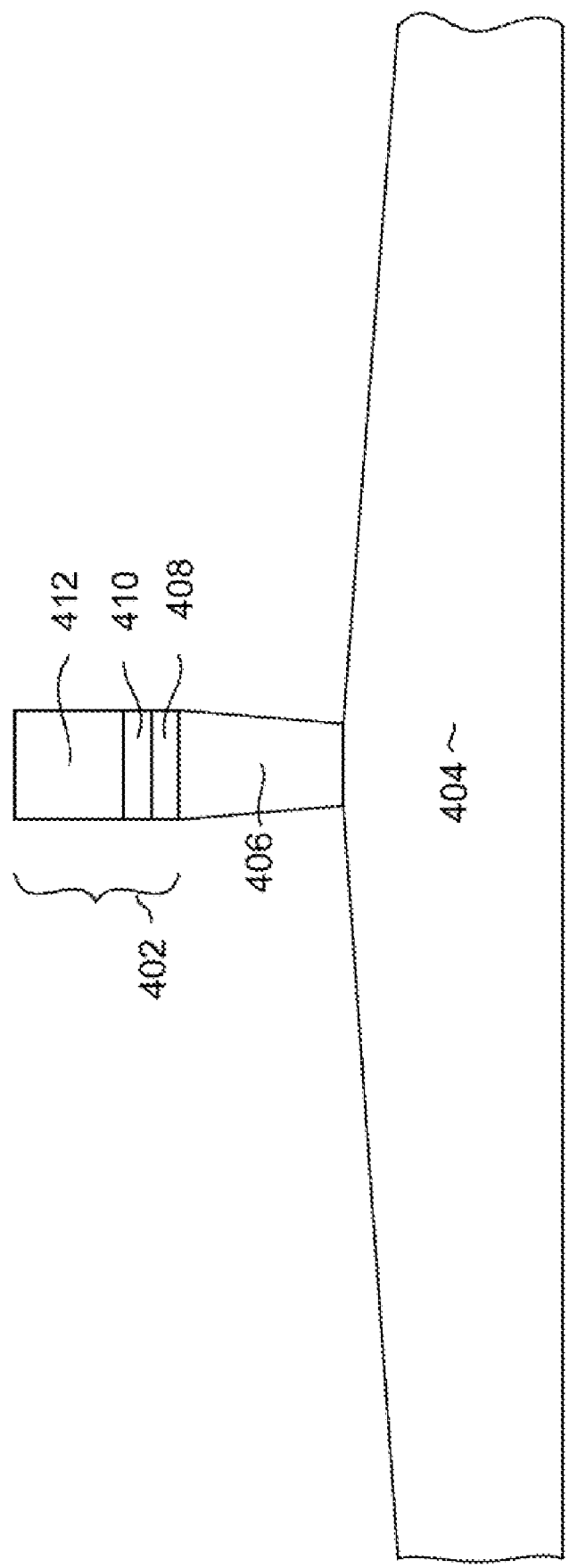

With reference now to FIG. 5, reactive ion etching (RIE) and reactive ion milling are performed to transfer the image of the photoresist mask 414 onto the underlying mask layers 408-412 by removing portions of the layers 408-412 that are not protected by the mask 414. Then, an ion milling operation is performed to remove portions of the magnetic write pole material 406 that are not protected by the mask structure. The ion milling can be performed at one or more angles relative to normal in order to form a write pole 406 having a trapezoidal shape as shown in FIG. 6. Also, as shown in FIG. 6, a portion of the mask structure 402 will be consumed by the ion milling process, leaving the first and second hard mask layers 408, 410 and possibly a portion of the image transfer layer 412. A wet stripping process is performed to remove layer 412.

Figure 7:
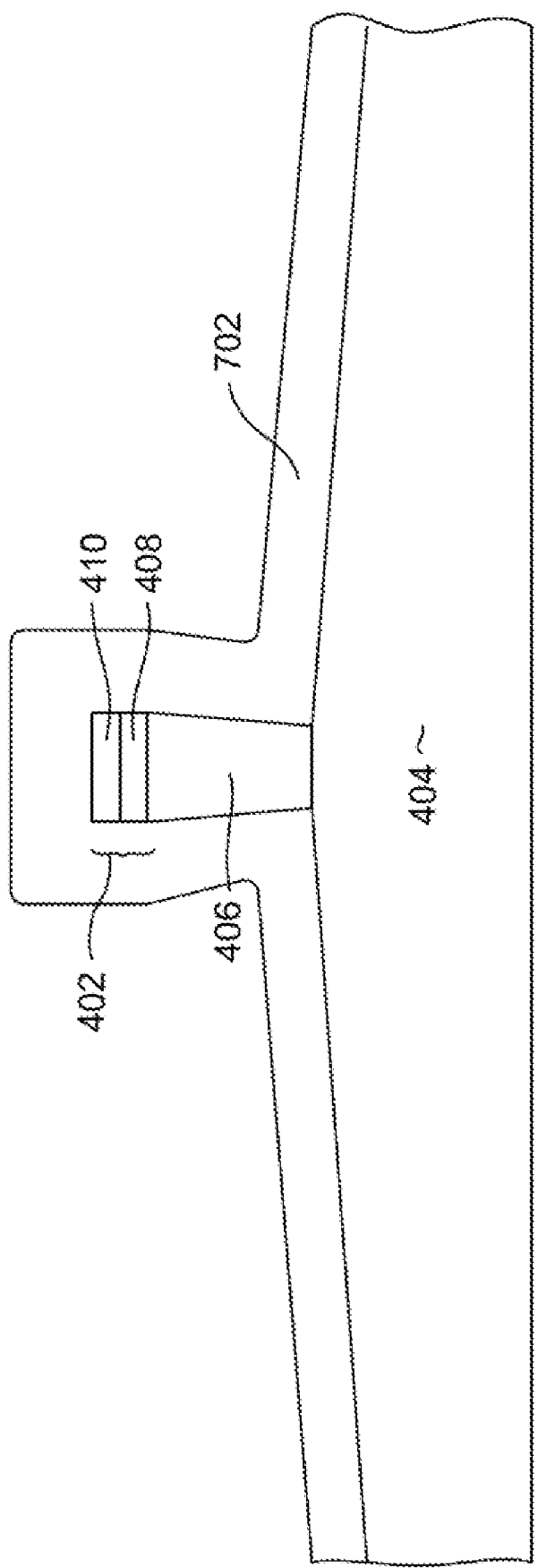
Figure 8:
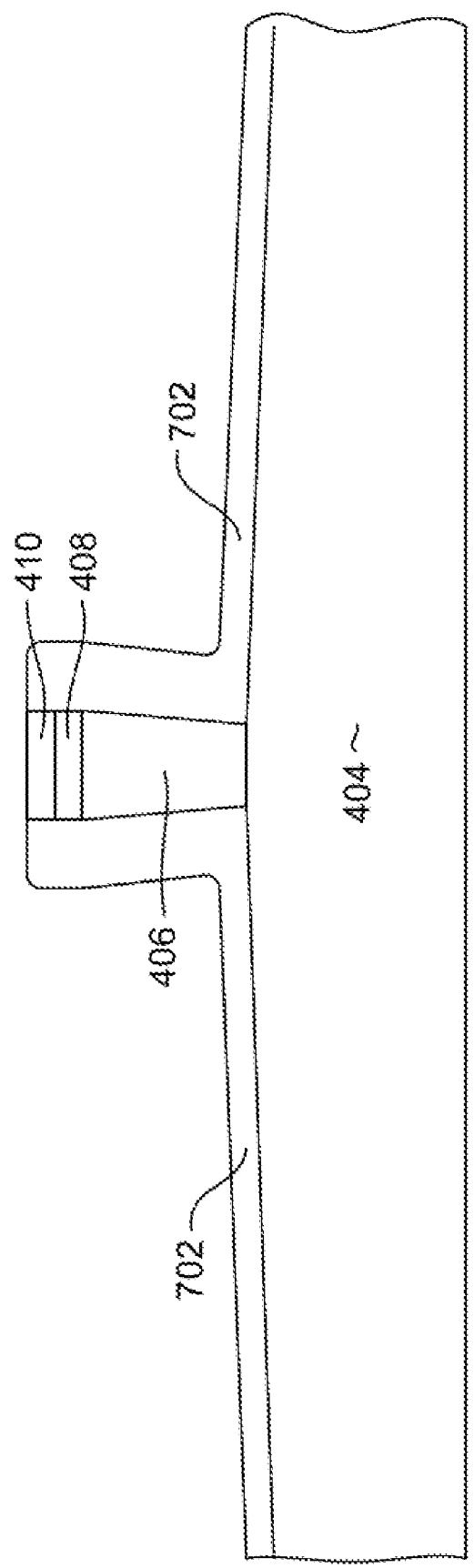
Figure 9:
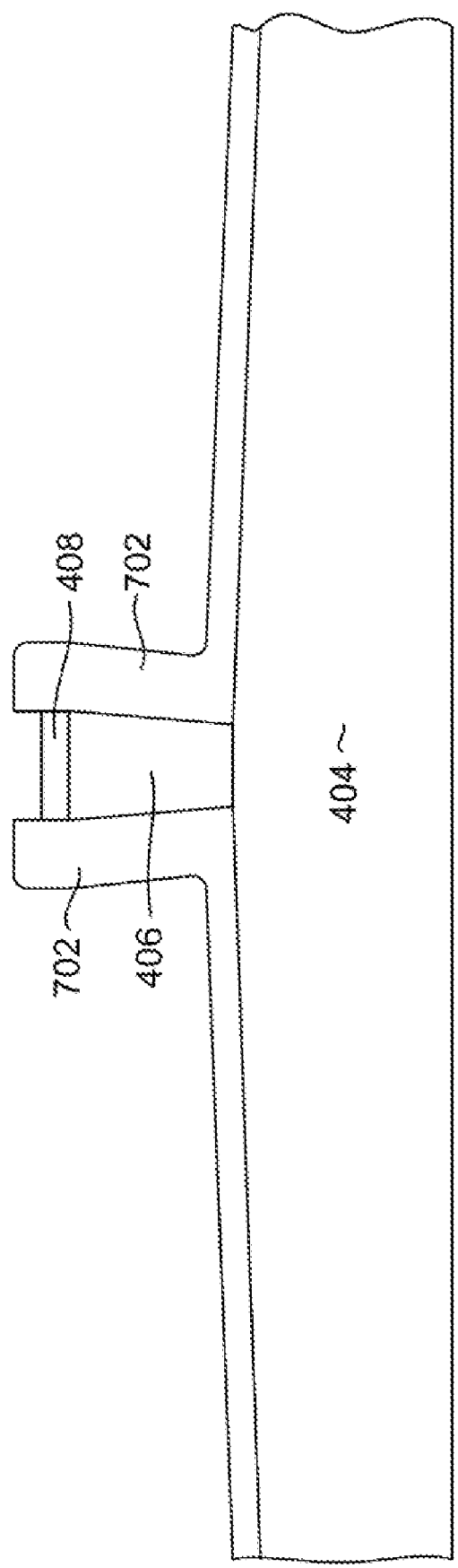

With reference now to FIG. 7, a layer of non-magnetic sidewall material 702 is deposited. The non-magnetic side wall material 702 is preferably alumina and is preferably deposited by a conformal deposition process such as atomic layer deposition or chemical vapor deposition. Then a material removal process is performed to preferentially remove horizontally disposed portions of the non-magnetic gap layer 702 leaving vertical, non-magnetic side gap walls 702 at either side of the write pole 406 as shown in FIG. 8. The material removal process can be, for example, reactive ion milling (RIM) or could include refilling with a RIEable fill layer, performing a chemical mechanical polishing process and then performing a reactive ion etching to remove the RIEable fill layer. Then, a reactive ion etching can be performed to remove the RIEable hard mask layer 410, leaving a structure as shown in FIG. 9.

Figure 10:
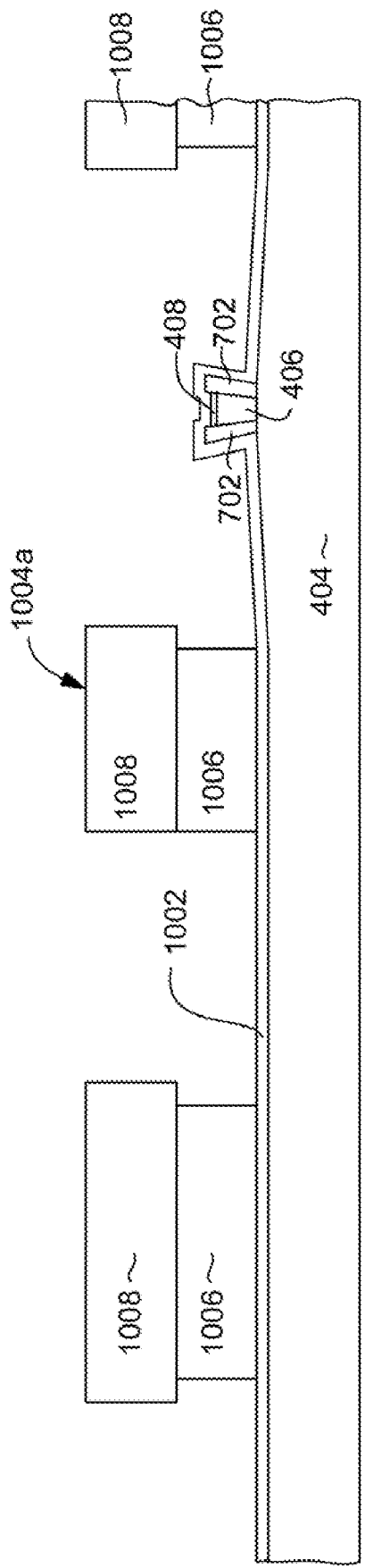
Figure 11:
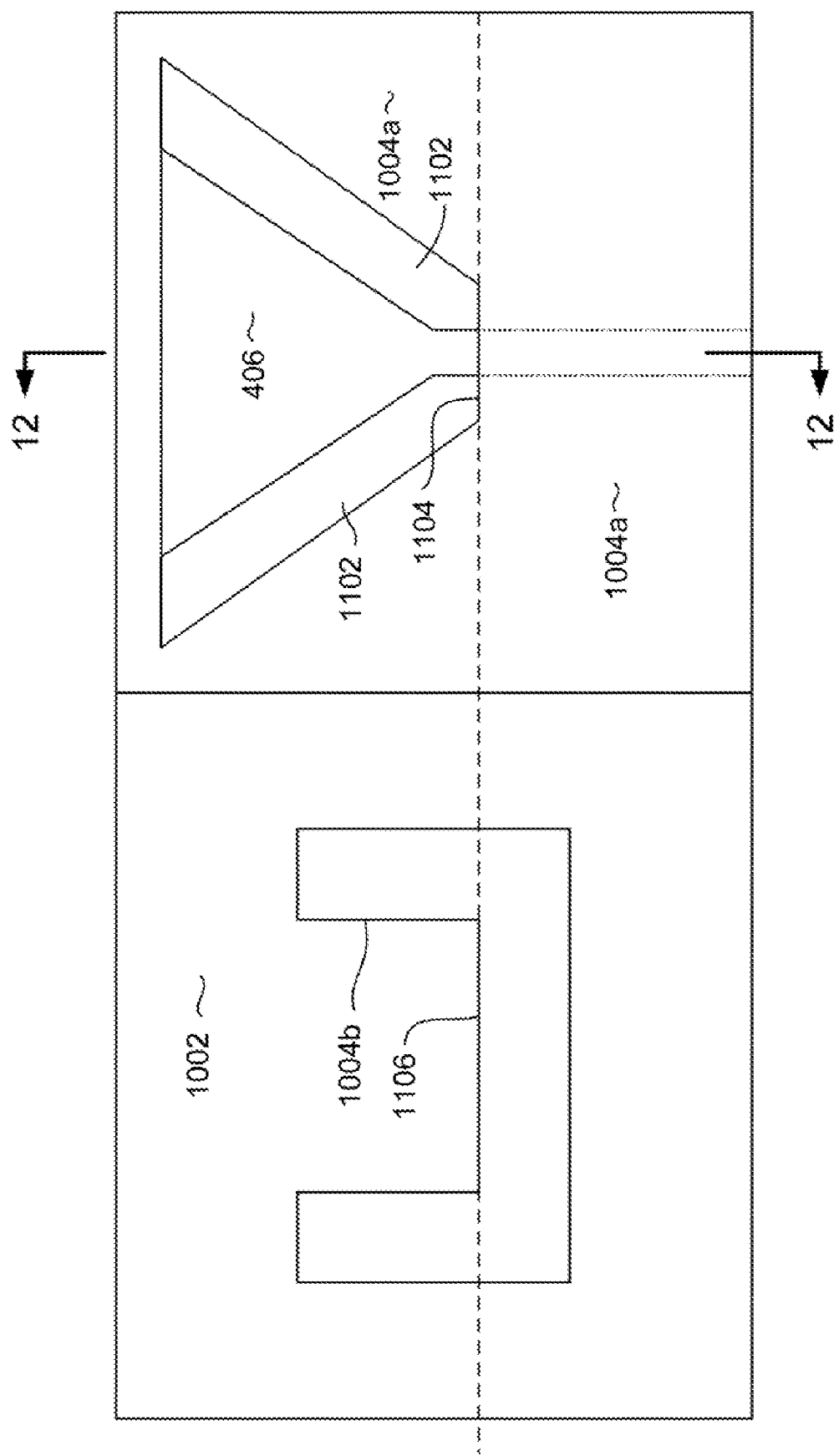

With reference now to FIG. 10, an electrically conductive, non-magnetic seed layer such as Rh 1002 is deposited full film. A bi-layer mask structure 1004 is then formed over the seed layer 1002. The mask 1004 can include a bottom layer of material such as Polymethylglutarimide (PMGI) 1006 and a layer of photoresist 1008 formed thereover. With reference to FIG. 11, a portion 1004a is formed in a write pole area and another portion of the mask 1004b is formed in an electrical lapping guide area removed from the write pole 406. The mask portion 1004a has an opening 1102 that is configured to define a yet to be formed non-magnetic bump. In the electrical lapping guide region, the mask 1004b covers a portion of the seed layer 1002b to define an electrical lapping guide. Because the portions 1004a and 1004b are formed in the same photolithographic patterning step, bump-defining front edge 1104 of the first mask portion 1004a is self aligned with the back edge 1106 of the ELG defining portion 1004. Although these edges may be offset from one another, the amount of offset can be known and easily controlled.

With the mask 1004 in place, an ion milling can be performed to remove portions of the electrically conductive, non-magnetic seed layer 1002 that are not protected by the mask portion 1104b in order to define an electrical lapping guide defined by the mask 1004b.

A layer of non-magnetic material such as alumina or TaO can then be deposited to form a non-magnetic bump within the opening 1102 in the mask portion 1004a. This can be seen more clearly with reference to FIG. 12 wherein it can be seen that the non-magnetic bump 1202 formed over the seed layer 1002 has a tapered front edge 1204. The non-magnetic bump layer 1202 is preferably deposited to a thickness of 30 to 300 nm or about 80 nm. The non-magnetic bump layer 1202 is preferably deposited by ion beam deposition, and shadowing from the overhanging bi-layer mask 1004 allows the edge 1204 to have the desired tapered shape. The angle of the tapered edge 1204 can be further controlled by controlling the angle of the ion beam deposition and the thickness of layer 1006.

Figure 12:
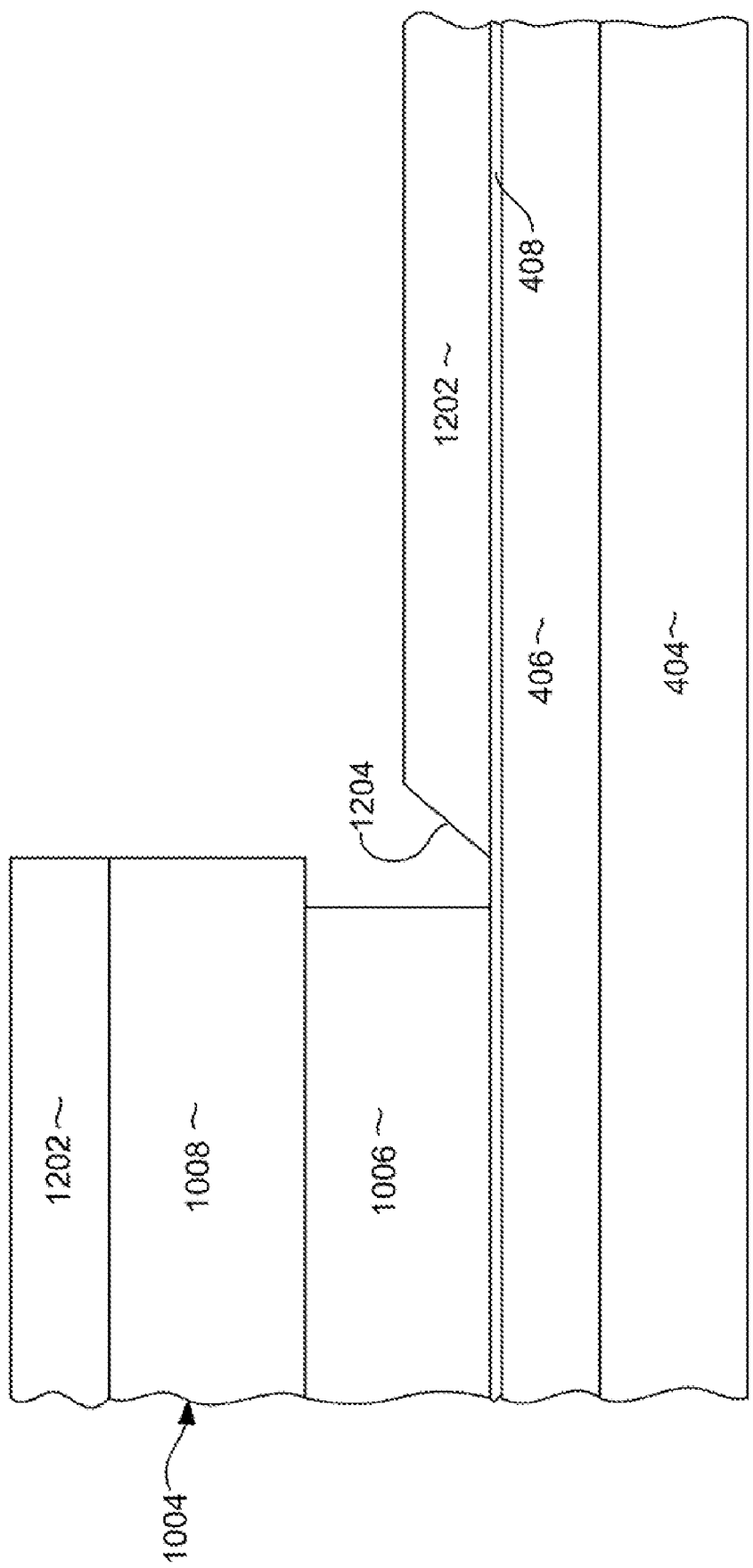
Figure 13:
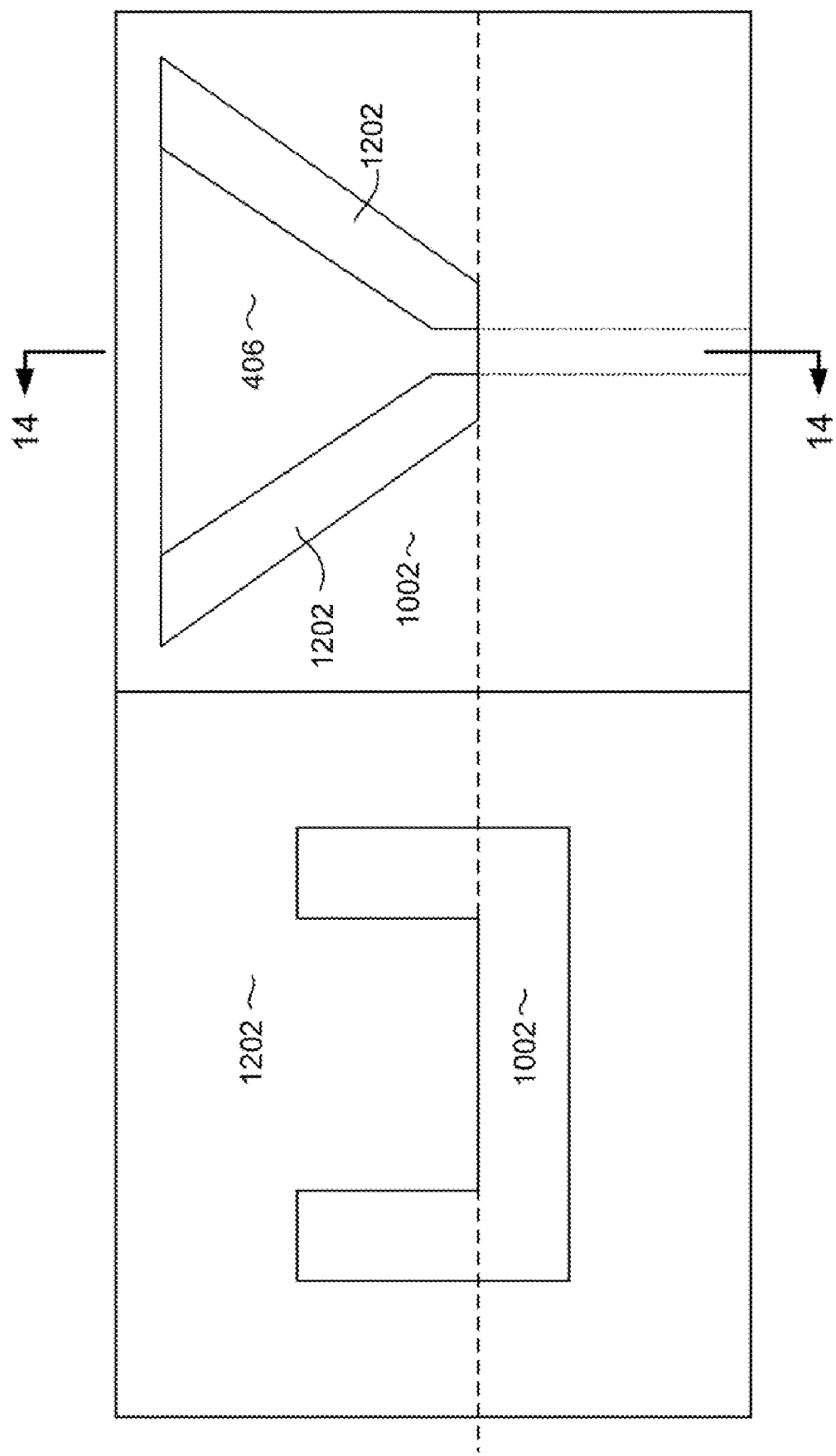
Figure 14:
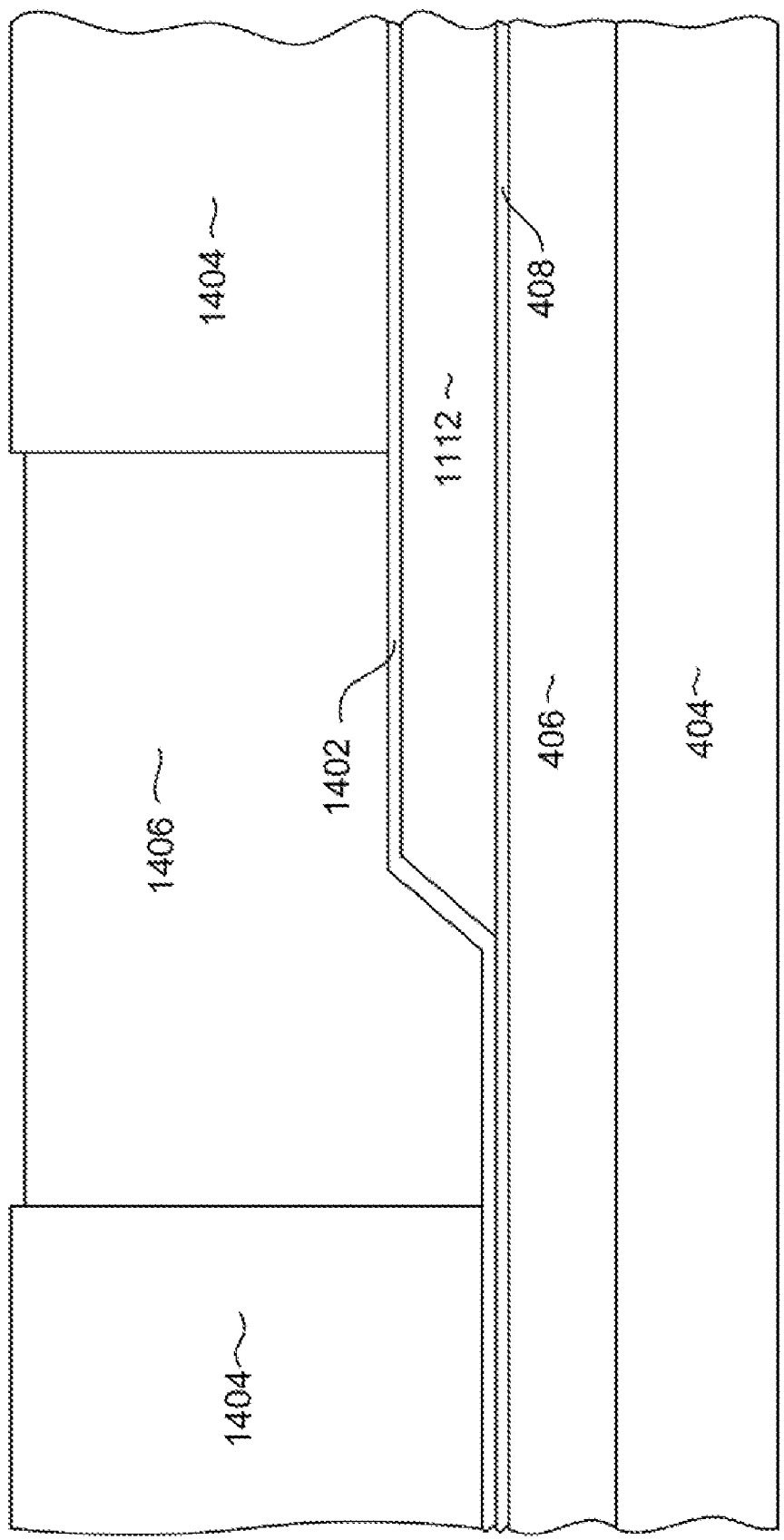

After the non-magnetic bump layer 1202 has been deposited, the mask 1004 can be lifted off, resulting in a structure as shown top down in FIG. 13. The bi-layer shape of the mask structure 1004 facilitates liftoff, even when the mask has been covered with the non-magnetic bump layer 1202 (FIG. 12). As can be seen, the above method not only forms a tapered non-magnetic bump, but also aligns the bump with the back edge of the electrical lapping guide (ELG) 1002. With reference now to FIG. 14, which shows a side cross section of the write pole 406, an electrically conductive seed layer 1402, such as CoFe or NiFe is deposited and an electroplating frame mask 1404 is formed with an opening configured to define a wrap-around magnetic shield. An electrically conductive material such as CoFe or NiFe can then be electroplated to form a trailing magnetic shield 1406.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
    providing a substrate;
    forming a magnetic write pole over the substrate, the write pole having a non-magnetic trailing gap layer formed on a trailing edge of the write pole and first and second non-magnetic side gap layers formed on first and second sides of the write pole;
    depositing a non-magnetic electrically conductive layer;
    forming mask structure over the non-magnetic, electrically conductive layer, the mask having an opening in an area over the write pole that defines a desired non-magnetic bump shape, and covering an area away from the write pole to define an electrical lapping guide (ELG);

performing an ion milling to remove an exposed portion of the non-magnetic, electrically conductive seed layer in the area away from the write pole to define an electrical lapping guide; and depositing a non-magnetic bump material to form a non-magnetic bump over a portion of the write pole;

wherein the deposition of the non-magnetic bump material is performed in a manner to form a tapered edge on the non-magnetic bump.

2. The method as in claim 1, further comprising, after depositing the non-magnetic bump material to form the non-magnetic bump over the portion of the write pole:

lifting off the mask;

depositing a seed layer;

forming a second mask structure having an opening over the write pole configured to define a magnetic shield; and electroplating a magnetic material into the opening in the second mask structure to form a wrap around magnetic shield.

3. The method as in claim 2 wherein the magnetic shield is formed over and edge of the non-magnetic bump.

4. The method as in claim 1 wherein the mask structure is a bi-layer structure having an overhang and wherein the bi-layer structure and overhang causes the deposited non-magnetic bump material to form the non-magnetic bump having the tapered front edge.

5. The method as in claim 1 wherein shadowing from the mask structure causes the non-magnetic bump to have the tapered front edge.

6. The method as in claim 1 wherein the depositing a non-magnetic bump material comprises ion beam deposition performed at one or more angles, chosen to form the non-magnetic bump with the tapered front edge.

7. The method as in claim 1 wherein the non-magnetic bump material comprises TaO, or Ta.

8. A method for manufacturing a magnetic write head, comprising:

providing a substrate;

forming a magnetic write pole over the substrate, the write pole having a non-magnetic trailing gap layer formed on a trailing edge of the write pole and first and second non-magnetic side gap layers formed on first and second sides of the write pole;

depositing a non-magnetic electrically conductive layer;

forming mask structure over the non-magnetic, electrically conductive layer, the mask having an opening in an area over the write pole that defines a desired non-magnetic bump shape, and covering an area away from the write pole to define an electrical lapping guide (ELG);

performing an ion milling to remove an exposed portion of the non-magnetic, electrically conductive seed layer in the area away from the write pole to define an electrical lapping guide; and depositing a non-magnetic bump material by ion beam deposition to form a non-magnetic bump over a portion of the write pole.

9. A method for manufacturing a magnetic write head, comprising:

providing a substrate;

forming a magnetic write pole over the substrate, the write pole having a non-magnetic trailing gap layer formed on a trailing edge of the write pole and first and second non-magnetic side gap layers formed on first and second sides of the write pole;

depositing a non-magnetic electrically conductive layer;

forming mask structure over the non-magnetic, electrically conductive layer, the mask having an opening in an area over the write pole that defines a desired non-magnetic bump shape, and covering an area away from the write pole to define an electrical lapping guide (ELG);

performing an ion milling to remove an exposed portion of the non-magnetic, electrically conductive seed layer in the area away from the write pole to define an electrical lapping guide; and depositing a non-magnetic bump material to form a non-magnetic bump over a portion of the write pole;

wherein the non-magnetic bump material comprises alumina.

10. A method for manufacturing a magnetic write head, comprising:

providing a substrate;

forming a magnetic write pole over the substrate, the write pole having a non-magnetic trailing gap layer formed on a trailing edge of the write pole and first and second non-magnetic side gap layers formed on first and second sides of the write pole;

depositing a non-magnetic electrically conductive layer;

forming mask structure over the non-magnetic, electrically conductive layer, the mask having an opening in an area over the write pole that defines a desired non-magnetic bump shape, and covering an area away from the write pole to define an electrical lapping guide (ELG);

performing an ion milling to remove an exposed portion of the non-magnetic, electrically conductive seed layer in the area away from the write pole to define an electrical lapping guide; and depositing a non-magnetic bump material to form a non-magnetic bump over a portion of the write pole;

wherein the non-magnetic bump material is deposited to a thickness of 30 to 300 nm.

11. A method for manufacturing a magnetic write head, comprising:

providing a substrate;

forming a magnetic write pole over the substrate, the write pole having a non-magnetic trailing gap layer formed on a trailing edge of the write pole and first and second non-magnetic side gap layers formed on first and second sides of the write pole;

depositing a non-magnetic electrically conductive layer, forming mask structure over the non-magnetic, electrically conductive layer, the mask having an opening in an area over the write pole that defines a desired non-magnetic bump shape, and covering an area away from the write pole to define an electrical lapping guide (ELG);

performing an ion milling to remove an exposed portion of the non-magnetic, electrically conductive seed layer in the area away from the write pole to define an electrical lapping guide; and depositing a non-magnetic bump material to form a non-magnetic bump over a portion of the write pole;

wherein the non-magnetic bump material is deposited to a thickness of about 80 nm.

12. A method for manufacturing a magnetic write head, comprising:

providing a substrate;

forming a magnetic write pole over the substrate, the write pole having a non-magnetic trailing gap layer formed on a trailing edge of the write pole and first and second non-magnetic side gap layers formed on first and second sides of the write pole;

depositing a non-magnetic electrically conductive layer;

forming mask structure over the non-magnetic, electrically conductive layer, the mask having an opening in an area over the write pole that defines a desired non-magnetic bump shape, and covering an area away from the write pole to define an electrical lapping guide (ELG);

performing an ion milling to remove an exposed portion of the non-magnetic, electrically conductive seed layer in the area away from the write pole to define an electrical lapping guide; and depositing a non-magnetic bump material to form a non-magnetic bump over a portion of the write pole;

wherein the non-magnetic bump material comprises alumina deposited to a thickness of 30 to 300 nm.

13. A method for manufacturing a magnetic write head, comprising:

providing a substrate;

forming a magnetic write pole over the substrate, the write pole having a non-magnetic trailing gap layer formed on a trailing edge of the write pole and first and second non-magnetic side gap layers formed on first and second sides of the write pole;

depositing a non-magnetic electrically conductive layer;

forming mask structure over the non-magnetic, electrically conductive layer, the mask having an opening in an area over the write pole that defines a desired non-magnetic bump shape, and covering an area away from the write pole to define an electrical lapping guide (ELG);

performing an ion milling to remove an exposed portion of the non-magnetic, electrically conductive seed layer in the area away from the write pole to define an electrical lapping guide; and depositing a non-magnetic bump material to form a non-magnetic bump over a portion of the write pole;

wherein the non-magnetic bump material comprises TaO or Ta, deposited to a thickness of 30 to 300 nm.

14. A method for manufacturing a magnetic write head, comprising:

providing a substrate;

depositing a magnetic write pole material over the substrate;

forming a first mask structure over the write pole material, the first mask structure being configured to define a write pole;

performing a first ion milling to remove portions of the write pole material that are not protected by the first mask structure to form the write pole;

depositing a non-magnetic side gap material;

performing a material removal process to preferentially remove horizontally disposed portions of the non-magnetic side gap material;

depositing a non-magnetic metal;

forming a second mask structure, the second mask structure having a first portion formed over the write pole the first portion having an opening with a front edge configured to define a front edge of a non-magnetic bump, and having a second portion configured to cover an area to define an electrical lapping guide;

performing a second ion milling to remove portions of the non-magnetic metal that are not protected by the second portion of the second mask structure to form the electrical lapping guide; and depositing a non-magnetic bump material;

wherein the deposition of the non-magnetic bump material is performed in a manner to form a tapered edge on the non-magnetic bump.

15. The method as in claim 14, wherein the second mask structure is a bi-layer mask structure having an over-hang, and wherein shadowing from the second mask structure causes the deposited non-magnetic bump material to form the non-magnetic bump having the tapered front edge.

16. The method as in claim 14 wherein the non-magnetic bump material is deposited by ion beam deposition, which is performed at an angle chosen to form the non-magnetic bump having the tapered edge.

17. The method as in claim 14 wherein the non-magnetic bump material comprises TaO deposited by ion beam deposition, the ion beam deposition being performed at an angle chosen to form the non-magnetic bump having the tapered front edge.

18. The method as in claim 14 wherein the non-magnetic bump material is alumina deposited by ion beam deposition, the ion beam deposition being performed at an angle chosen to form the non-magnetic bump having the tapered front edge.

19. The method as in claim 14 wherein the second mask structure is a bi-layer structure having an over-hang, and wherein the deposition of the non-magnetic bump material comprises an ion beam deposition performed at an angle such that shadowing from the bi-layer second mask structure causes the deposition of the non-magnetic bump material to form the non-magnetic bump having the tapered front edge.

* * * * *